United States Patent [19]

Barnett

[11] 4,435,746

[45] Mar. 6, 1984

[54] INDUCTIVE REACTIVE VOLTAGE REGULATOR

[75] Inventor: Ralph M. Barnett, Brownsville, Tex.

[73] Assignee: Atari, Inc., Sunnyvale, Calif.

[21] Appl. No.: 369,292

[22] Filed: Apr. 16, 1982

[51] Int. Cl.³ .................... H02M 3/335; H02P 13/10

[52] U.S. Cl. ........................................ 363/21; 363/75; 363/97

[58] Field of Search .................. 363/18–21, 363/22–26, 75, 82, 90–91, 97; 358/190; 315/411

[56] References Cited

U.S. PATENT DOCUMENTS

| | | | |
|---|---|---|---|
| 3,828,239 | 8/1974 | Nagai et al. | 363/20 |
| 4,004,209 | 1/1977 | Lawson, Jr. | 363/75 X |
| 4,007,413 | 2/1977 | Fisher et al. | 363/18 |
| 4,339,792 | 7/1982 | Yasumura et al. | 363/91 X |

Primary Examiner—Peter S. Wong
Attorney, Agent, or Firm—Townsend & Townsend

[57] ABSTRACT

The DC secondary output voltage of a high voltage switched-type power supply is regulated by automatically increasing or decreasing the amplitude of the primary circuit retrace pulse to compensate for variations in loading imposed on the secondary or output circuit. The automatic regulation is accomplished by the use of a passive saturable reactor coupled in a series with the primary winding of the step-up transformer. The saturable reactor has a saturation characteristic with a relatively low saturation level. Within the saturation limits, the saturable reactor provides a reservoir of energy which can be used to buck the peak voltage pulse applied across the primary, thus controlling the output voltage. The apparatus provides good regulation with minimum number of additional components.

13 Claims, 11 Drawing Figures

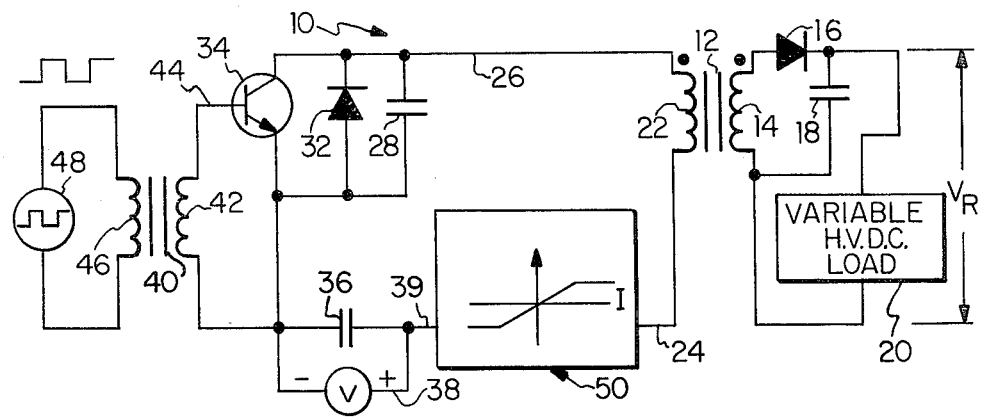
FIG. 1
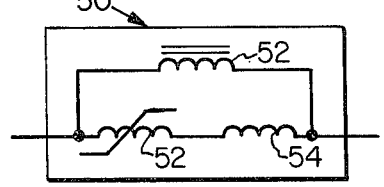
FIG. 2A
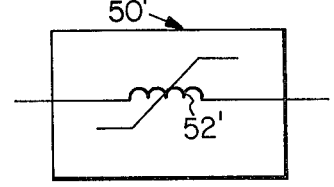
FIG. 2B
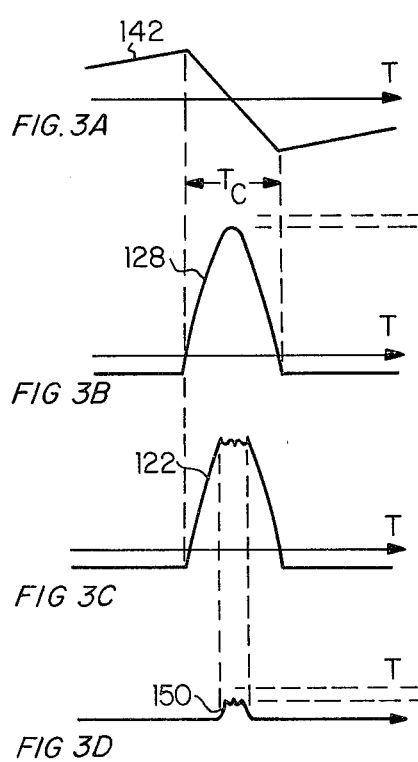
FIG. 3A
FIG. 3B
FIG. 3C
FIG. 3D
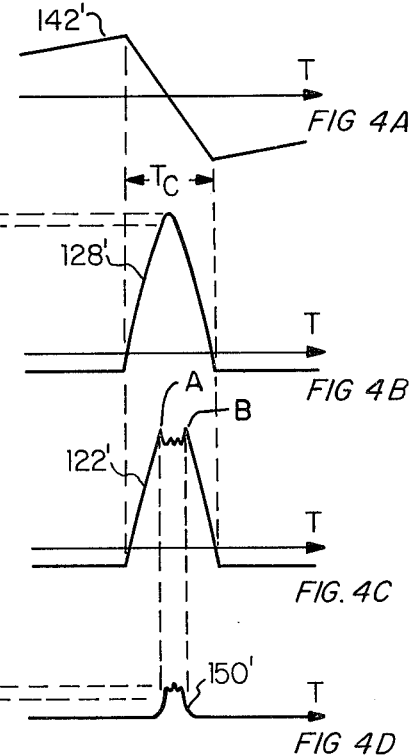
FIG. 4A
FIG. 4B
FIG. 4C
FIG. 4D

INDUCTIVE REACTIVE VOLTAGE REGULATOR

BACKGROUND OF THE INVENTION

1. Field of the Invention

This invention relates to voltage regulation of a pulse-charged direct current power supply subject to variable loading. In particular, the invention relates to an apparatus for use in regulating DC plate voltage of a cathode ray tube (CRT) or the like under rapidly changing current loads.

A retrace or flyback circuit employing a step-up transformer is typically used for providing high direct current voltage of relatively low current to the plate (or anode) circuit of a cathode ray tube, a laser, a microwave tube or the like. In such a circuit, an output diode rectifies AC from the secondary winding of step-up transformer, often call the flyback transformer, which is then used to charge an output or funnel capacitor in which charge is stored for use in supplying the DC current requirements of the load. The output capacitor is charged by a DC pulse generally having a duty cycle of less than 50% and typically on the order of 20%, corresponding to the retrace time of a raster-scan cathode ray tube system or the flyback time in a pulsed power supply.

The retrace or flyback time is the period during which there is maximum current into and out of the primary winding of the step-up transformer. A characteristic abrupt reversal of current creates a voltage pulse across a retrace capacitor in the primary circuit. The pulse across the retrace capacitor appears as a pulse across the primary winding of the step-up transformer. The retrace time is generally a fixed parameter.

The average voltage level across the output capacitor is determined by the net charge maintained in the capacitor, which is the difference between the input time-current product supplied by the retrace pulse and the output time-current product drawn off by the load. The loading of the secondary circuit is reflected to the primary and appears in the form of peak-to-peak primary current, which either leads or trails the peak-to-peak primary voltage, depending upon the impedance characteristics of the circuit. In some applications, the primary and secondary circuits may be designed to take advantage of the resonant characteristics of the AC circuit components.

An increase in the output loading, that is, an increase in the current drain, is reflected as an increase in the loading demand on the primary circuit. Consequently at least a temporary decrease in the output voltage follows a sudden change in the current load.

Inherent compensation is generally not satisfactory. For example, a change of current from 150 micro Ampere to 1150 micro Ampere in a 20,000 volt secondary voltage may cause as much as a 2,000 volt drop in the output voltage for a typical-sized output capacitor. A decrease in output voltage is highly undesirable. In a cathode ray tube, for example, the electrons emitted by the cathode are not accelerated as rapidly at lower voltages, and as a result the electrons are deflected to a greater degree along their path of travel. This undesirable condition is known as blooming.

What is needed is a mechanism for accurately regulating the voltage of a high voltage DC power to minimize effects such as blooming.

2. Description of the Prior Art

Various voltage regulation schemes are known. Generally, voltage regulation requires the use of active components employing complex feedback circuitry to monitor and accurately control the level of the retrace pulse. Such schemes may involve the use of a sensing resistor to generate a feedback signal. Such prior art schemes are often expensive. Only the most expensive and complex schemes known provide accurate and reliable voltage regulation. There is a need to provide for accurate and reliable voltage regulation which is also inexpensive. Inexpensive and inherently reliable voltage regulators are extremely important in cost sensitive applications such as consumer-oriented products, where sophisticated schemes are simply not practical because of cost considerations.

SUMMARY OF THE INVENTION

According to the invention, the DC secondary output voltage of a high voltage switched-type power supply is regulated by automatically increasing or decreasing the retrace pulse seen by the primary circuit to compensate for load variations imposed on the secondary. The automatic regulation is accomplished by the use of a passive saturable reactor coupled in series with the primary winding. The saturable reactor has a saturation characteristic with a relatively low saturation level. The reactor is saturable in the range of expected voltage variation levels due to load variations. The saturable reactor is operative to buck voltage applied to the primary, thereby cancelling a portion of the retrace pulse. As current is increased in the primary due to secondary loading, the total retrace time stays substantially the same while the retrace time of the saturable reactor is reduced in proportion to the increase in primary current. This allows the voltage across a primary to increase to buck the drop in voltage in the secondary circuit. The reactor provides the reservoir of energy which is tapped to control the primary voltage characteristic and thus the output voltage.

Passive voltage regulation according to the invention has been shown to be relatively accurate. A change of 150 micro Ampere load to a 1150 micro Ampere load in a 20,000 voltage circuit has been shown to result in regulation within 50 volts peak-to-peak.

The invention will be better understood by reference to the following detailed description taken in connection with the accompanying drawings.

BRIEF DESCRIPTION OF THE DRAWINGS

FIG. 1 is a schematic diagram of a regulated high voltage power supply according to the invention.

FIG. 2A is a schematic diagram of one embodiment of a saturable reactor according to the invention.

FIG. 2B is a second embodiment of a saturable reactor according to the invention.

FIGS. 3A through 3D are waveform diagrams illustrating operation of a regulator according to the invention under light loading.

FIGS. 4A through 4D are waveform diagrams illustrating operation of the regulator according to the invention under heavy loading.

DESCRIPTION OF SPECIFIC EMBODIMENTS

Turning to FIG. 1, a retrace or flyback-type switched power supply circuit 10 comprises a transformer 12 having a secondary winding 14 and primary winding 22 separating primary and secondary circuits. The secondary winding 14 is connected in series with a rectifier 16, such as a diode. An output or funnel capacitor 18 is coupled between the secondary winding 14 and the rectifier 16 to form a charging circuit. The funnel capacitor 18 is across input terminals to a variable high voltage DC load 20. The load 20 may be a CRT plate circuit and a bleeder resistor (not shown).

A load 20 designed for television applications completes a trace and retrace cycle approximately every 64 micro seconds at a frequency of 15,734 Hertz, thus synchronizing with the U.S. standard broadcast television system (NTSC). Other oscillation frequencies may be chosen, depending on the applications. A typical oscillation frequency is 25 kHz. The secondary winding 14 provides a retrace pulse having a duration of $T_C$ of 8.4 micro seconds, as illustrated in FIGS. 3A and 4A. The charge time $T_C$ is essentially invariant for each circuit.

The primary circuit comprises a first primary line 24, second primary line 26, a retrace capacitor 28, a commutating or damper diode 32 coupled across the retrace capacitor 28, a switch 34 coupled across the retrace capacitor 28, a regulated DC power supply 38, a primary capacitor 36 coupled across the DC power supply 38 and to a third primary line 39, an exciter circuit comprising an exciter transformer 40 with a secondary winding 42 coupled to the gating input 44 of the switch 34 and to a common node of the retrace capacitor 28, commutating diode 32, switch 34, primary capacitor 36 and power supply 38. The exciter transformer 40 has a primary winding 46 coupled to a pulse or square wave generator 48, which controls the duty cycle of the switch 34.

According to the invention, a saturable reactor 50 is provided in the primary circuit including the retrace capacitor 28 for passively bucking the peak voltage across the retrace capacitor 28. The saturable reactor 50 may be coupled between the third primary line 39 and first primary line 24 in series with the primary winding 22.

The saturable reactor 50 is characterized as follows. It has no substantial back EMF at peak-to-peak current above a predefined level. It has zero hysteresis over a range limited by the current which is determined by the maximum designed current load in the primary circuit. The saturable reactor 50 is essentially out of the circuit, i.e., appears like a short circuit, for any current above a predetermined primary current level. In a specific embodiment, the current level at the threshold is preferably about 1.5 to 2 Ampere.

The saturable reactor 50 operates in the circuit generally to buck voltage applied to the primary due to increase in the current draw during the fixed retrace time. Referring to FIG. 3A, the current 142 during the retrace time $T_C$ is shown. The turning off of switch 34 causes a reversal in direction of current 142 which is commutated by commutating diode 32. This abrupt reversal in current direction creates a high-voltage pulse across the primary 22 and secondary 24 of the output transformer 12. This pulse is reflected in the retrace capacitor 28 as a retrace voltage pulse 128. During the retrace time, according to the invention, the transition of high current of one polarity to the opposite polarity allows the reactor 50 to create a reactor retrace pulse 150 (FIG. 3D). The reactor retrace pulse 150 is of the same polarity as the retrace pulse 128 across the retrace capacitor 28, thereby causing a proportional canceling of the pulse 122 applied to the primary 22. The pulse 122 therefore appears under light loading as a half-sine wave with a nearly flat top. The same pulse shape is reflected through the secondary 14 to charge the output capacitor 18.

As loading is increased, the voltage across the output capacitor 18 tends to droop under increased current draw. The increase in current draw is reflected in an increase in primary peak-to-peak current 142' (FIG. 4A). The increase in primary peak current causes an increase in the peak-to-peak retrace pulse 128' (FIG. 4B).

The reactor 50 according to the invention regulates the output voltage in two ways. First, under heavy loading, the peak-to-peak pulse 150' is greater than the peak-to-peak pulse 150 under light loading (compare FIGS. 4D and 3D). This peak-to-peak reactor pulse subtracts from the maximum peak-to-peak retrace pulse 128', which under heavy load is of greater magnitude than the peak-to-peak retrace pulse 128 under light loading. Second, the width or duration of the reactor pulse 150' under heavy loading is less than the width of the reactor pulse 150 under light loading, since the low current period of the current 142' under heavy loading is less than the low current period of the output current 142 under light loading. Thus the cancellation time is confined to a time frame which is steadily less as peak-to-peak primary current 142' increases. The heavy load voltage pulse 122' is thus cancelled by the reactor pulse 150' during a time frame which is confined to less and less of a period during increase in the rate of change in the peak-to-peak primary current 142'. The voltage pulse 122' across the primary 22 is then characterized by an increase in peak voltage on each side of the cancellation pulse caused by the reactor retrace pulse 150, namely, on the leading edge A and the trailing edge B of waveform 122'. The duty time under heavy loading is generally about the same as under light loading. However, the pulse shape has been modified to provide a pair of increasing peaks as the peak-to-peak primary current 142' is increased.

The waveform of the primary pulse 122' can be tailored according to the design of the reactor 50. Referring to FIGS. 2A and 2B, there is shown a first preferred embodiment of a reactor 50 and a second preferred embodiment of a reactor 50'. The first preferred embodiment of the reactor 50 comprises a first inductor 52 consisting of a coil wrapped on an easily saturating core connected in series with a second inductor 54 which is an air-wound coil. This series combination is connected in parallel with a third inductor 52 consisting of a coil wrapped on a non-saturating type core. Proper series and parallel selection of the inductor values according to known relationships for series and parallel connections enables the designer to formulate the desired wave shape for the reactor pulse characteristics from light loading as in reactor pulse 150 to heavy loading as in reactor pulse 150'. Alternatively, referring to FIG. 2B, a reactor 50' may be provided consisting of a single inductor 52' which is a coil wrapped on a saturable core, wherein the coil has the necessary inductance and the core has the necessary saturation characteristics to produce essentially zero hysteresis at non-saturating current levels and to appear as a short circuit above the relatively low current saturation level.

The invention has now been explained with reference to specific emodiments. Other embodiments will be apparent to those of ordinary skill in the art. It is therefore not intended that this invention be limited except as indicated by the appended claims.

I claim:

1. In a pulse-charged direct-current power supply apparatus, said apparatus comprising a secondary circuit, a primary circuit and a transformer having a secondary winding coupled to said secondary circuit and a primary winding coupled to said primary circuit, said secondary circuit comprising rectifying means coupled in series to said secondary winding, first charge storing means coupled across said secondary winding, and a direct current load subject to variable current draw, said load being coupled across said first charge storing means, said primary circuit comprising second charge storing means, switching means and third charge storing means, said second charge storing means and said third charge storing means being coupled in series with said primary winding, and said switching means being coupled across said third charge storing means and in series with said second charge storing means, said switching means including means for driving said switching means at a predetermined duty cycle and frequency to generate a reversal in current through said primary circuit, said reversal in current causing a voltage pulse to appear across said transformer, an apparatus for regulating secondary voltage comprising a saturable reactor means coupled in series with said primary winding for bucking said voltage pulse in accordance with the current loading of said primary circuit.

2. In an apparatus according to claim 1, said saturable reactor means comprising a coil wound about an easily saturating core.

3. In the apparatus according to claim 2, wherein said coil wound on an easily saturating core is connected in series with a coil having an air core, said coil having an air core and said coil having an easily saturating core being connected in parallel with a coil having a non-saturating core.

4. In the apparatus according to claim 1, wherein the saturable reactor comprises a coil having an easily saturating core, said saturing core having substantially zero hysteresis between saturation limits.

5. In the apparatus according to claims 1, 2, 3 or 4, a saturable reactor means having a saturation current level of less than about 2 Ampere.

6. The apparatus of claim 1 wherein said saturable reactor means is adapted to go into saturation in response to said switch means closing.

7. In a pulse-charged direct-current power supply apparatus, said apparatus comprising a secondary circuit, a primary circuit and a transformer having a secondary winding coupled to said secondary circuit and a primary winding coupled to said primary circuit, said secondary circuit comprising rectifying means coupled in series to said secondary winding, first charge storing means coupled across said secondary winding, and a direct current load subject to variable current draw, said load being coupled across a first charge storing means, said primary circuit comprising second charge storing means and third charge storing means being coupled in series with said primary winding, and said switching means being coupled across said third charge storing means and in series with said second charge storing means, said switching means including means for driving said switching means at a predetermined duty cycle and frequency to generate a reversal in current through said primary circuit, said reversal in current causing a voltage pulse to appear across said transformer, a method for regulating secondary voltage comprising applying power through a saturable reactor means coupled in series with said primary winding, said saturable reactor means appearing as a short circuit at current levels above a pre-selected level, and generating a reactor retrace pulse with substantially zero hysteresis at a current level below said pre-selected level to oppose peak power applied to said transformer.

8. The method according to claim 7, wherein said reactor retrace pulse increases in magnitude and decreases in duration with increasing current loading.

9. A circuit for providing DC power comprising:
a transformer having a primary winding and a secondary winding;
a switch coupled in series with said primary winding;
a power source for causing current to flow through said primary winding when said switch is closed; and
a saturable inductive reactor coupled in series with said primary winding and said power source, said reactor going into saturation when the current through said reactor is greater than a predetermined minimum, said reactor being adapted to reduce the voltage across said primary winding when said reactor is not in saturation.

10. The circuit in claim 9 further comprising a first capacitor coupled across said switch, said capacitor being charged and discharged when said switch opens.

11. The circuit in claim 10 further comprising:
a first diode coupled in series with said secondary winding; and
a second capacitor coupled in series with said first diode and said secondary winding.

12. The circuit in claim 11 further comprising a second diode coupled across said switch.

13. The circuit in claim 12 wherein said saturable inductive reactor is adapted to go into saturation when said switch closes.

* * * * *